United States Patent
Iroaga

(10) Patent No.: US 6,819,515 B1
(45) Date of Patent: Nov. 16, 2004

(54) METHOD AND CIRCUIT FOR ELIMINATING GLITCHES IN A DISK DRIVE READ HEAD

(75) Inventor: Echere Iroaga, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 478 days.

(21) Appl. No.: 09/664,278

(22) Filed: Sep. 18, 2000

Related U.S. Application Data

(60) Provisional application No. 60/184,855, filed on Feb. 25, 2000.

(51) Int. Cl.[7] .............................. G11B 5/09; G11B 5/02; G11B 5/03
(52) U.S. Cl. .............................. 360/66; 360/46; 360/67
(58) Field of Search .............................. 360/67, 46, 66; 369/44; 327/227

(56) References Cited

U.S. PATENT DOCUMENTS

| | | | |
|---|---|---|---|
| 5,856,891 A | * | 1/1999 | Ngo .............................. 360/66 |
| 5,877,911 A | | 3/1999 | Klaassen et al. .............. 360/67 |
| 6,118,611 A | * | 9/2000 | Shibasaki et al. .............. 360/67 |
| 6,271,977 B1 | * | 8/2001 | Chung et al. .................. 360/46 |
| 6,271,978 B1 | * | 8/2001 | Block et al. .................. 360/46 |
| 6,297,921 B1 | * | 10/2001 | Price et al. .................... 360/68 |

* cited by examiner

Primary Examiner—David Hudspeth
Assistant Examiner—Glenda Rodriguez
(74) Attorney, Agent, or Firm—W. Daniel Swayze, Jr.; W. James Brady; Frederick J. Telecky, Jr.

(57) ABSTRACT

An improved bias circuit for a disk drive head which reduces or eliminates transients while switching biasing. Embodiments of the invention are directed to eliminating transients while switching the bias of a MR head such as from current bias to voltage biasing. In an embodiment of the present invention, bias enable signals from a control circuit are inputs to delay circuits. The delay circuits provide a delay on the high-to-low transition, and essentially no delay on the low-to-high transition. The unsymmetrical delay ensures that the read head bias current will continue to be driven during the biasing transition to reduce voltage swings that could damage the head.

10 Claims, 2 Drawing Sheets

METHOD AND CIRCUIT FOR ELIMINATING GLITCHES IN A DISK DRIVE READ HEAD

This application claims the benefit of provisional application No. 60/184,855, filed Feb. 25, 2000.

TECHNICAL FIELD OF THE INVENTION

This invention relates generally to the field of information storage, and more particularly to a method and apparatus for eliminating voltage transients or glitches in a disk drive read head, particularly while switching the biasing.

BACKGROUND OF THE INVENTION

In general, mass storage devices, such as hard disk drives, include a magnetic storage media, such as rotating disks or platters, a spindle motor, read/write heads, an actuator, a pre-amplifier, a read channel, a write channel, a servo circuit, and control circuitry to control the operation of the hard disk drive and to properly interface the hard disk drive to a host system or bus.

In advanced disk drives, magneto-resistive (MR) heads are used for reading and writing data. An MR head generally includes an MR read element or sensor for reading data from the data tracks and an inductive write coil for writing data to the data tracks. In order to guide the MR head over a data track while the disk is rotating, servo sectors are placed in the track along with data sectors. These servo sectors are read by the same MR sensor that reads the data sectors. The presence of the servo sectors makes it necessary to interrupt the writing during write cycles of the MR head as the head passes over a servo sector to allow the head to read the sector. Furthermore, with the disk rotating at a very high speed, it is crucial that the MR head be ready for reading data almost immediately after it is switched from write or idle mode to read mode, to avoid skipping portions of the track. The thermal response of the MR sensor, due to the variation in the MR sensor bias current as the MR head mode changes, prevents the MR sensor from reaching steady-state until several microseconds after the MR head changes its operational state.

Pre-amplifying circuits for MR heads are described, for example, in U.S. Pat. Nos. 5,122,915 and 5,032,935. Due to the thermal response problem described above, the prior art pre-amplifying circuits typically generate undesirable transient voltages at their outputs as the MR head switches from write or idle mode to read mode. These transients result because the MR sensor is biased with a different current in each operational state.

Normally, the MR sensor is not biased when the MR head is in write mode or in idle mode to save power. With the MR head off, overdriving may occur, which is caused mainly by the capacitance coupling between the MR sensor and the write coil of the MR head. When the MR head is in write or idle mode, the amplifier coupled to the MR sensor is usually switched off. Upon the MR head switching to read mode, the MR sensor is again biased with a DC-current. This bias current causes the temperature of the MR sensor to rise from its value when the MR head was in write or idle mode until the steady-state temperature is achieved. The temperature rise results in a change in the MR sensor resistance, which depends on the temperature coefficient of the MR sensor. The variation in the MR sensor resistance in turn produces a transient voltage at the output of the read-back pre-amplifying circuit, thus preventing the MR head from properly reading data for several microseconds immediately after the MR head switches to read state.

MR heads typically use current biasing to sense the data on the disk. The current bias can be used to bias the MR heads during write mode for the benefits described above. More recently, voltage biasing has been used to supply a bias to the head during servo data write and at other times such as an idle state. Using voltage biasing during servo bank write has the advantage of insuring a more constant bias current when several or all the heads are being written simultaneously. Biasing of the MR head during servo bank write is important to protect the head as well as keep the MR head at the proper temperature. A voltage transient or glitch often occurs when the head bias is switched from current bias to voltage bias and at other times when switching is done in the pre-amp circuit. Eliminating or reducing these glitches is also important to protect the MR head and extend the head lifetime.

SUMMARY OF THE INVENTION

The present invention provides an improved bias circuit for a disk drive head which reduces or eliminates transients while switching biasing. Embodiments of the invention are specifically directed to eliminating transients while switching the bias of a MR head such as from current bias to voltage biasing.

In an embodiment of the present invention, bias enable signals from a control circuit are inputs to delay circuits. The delay circuits provide a delay on the high-to-low transition, and essentially no delay on the low-to-high transition. This unsymmetrical delay ensures that the read head bias current will continue to be driven during the biasing transition to reduce voltage swings that could damage the head.

BRIEF DESCRIPTION OF THE DRAWINGS

A more complete understanding of the teachings of the present invention may be acquired by referring to the accompanying figures in which like reference numbers indicate like features and wherein.

DETAILED DESCRIPTION OF THE INVENTION

Figure 1:
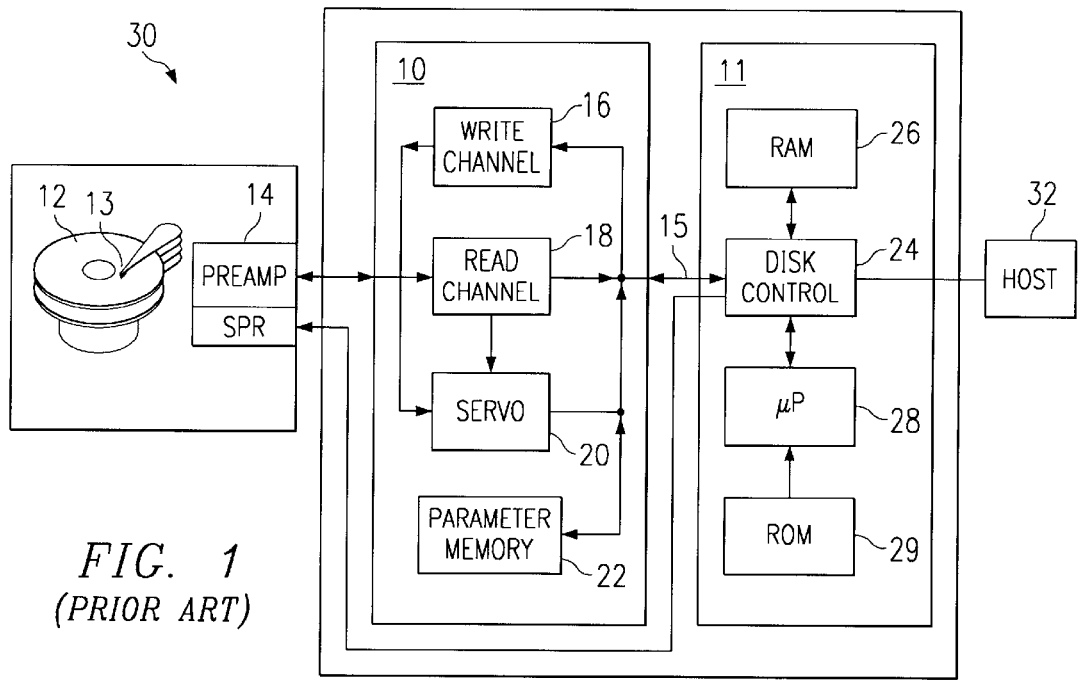
FIG. 1 is a block diagram illustrating an exemplary disk drive mass storage system.

FIG. 1 provides one example of a prior art disk drive mass storage system 30. Disk drive system 30 interfaces and exchanges data with a host 32 during read and write operations. Disk drive system 30 includes a disk/head assembly 12, a preamplifier 14, a synchronously sampled data (SSD) channel 10, and a control circuit 11. Disk/head assembly 12 and preamplifier 14 are used to magnetically store data. SSD channel 10 and control circuitry 11 are used to process data that is being read from and written to disk/head assembly 12 and to control the various operations of disk drive mass storage system 30. Host 32 exchanges digital data with control circuitry 11.

Disk/head assembly 12 includes a number of rotating platters used to store data that is represented as magnetic transitions on the magnetic platters. Read/write heads 13 of disk/head assembly 12 are used to store and retrieve data from each side of the magnetic platters. Read/write heads 13 may comprise any type of available read/write heads such as magneto-resistive heads. Preamplifier 14 serves as an interface between read/write heads 13 of disk/head assembly 12 and SSD channel 10, and provides amplification to the waveform data signals as needed.

SSD channel 10 is used during read and write operations to exchange analog data signals with disk/head assembly 12 through preamplifier 14 and to exchange digital data signals with control circuitry 11 through a data/parameter path 15. SSD channel 10 includes a write channel 16, a read channel 18, a servo control 20, and a parameter memory 22. SSD channel 10 may be implemented as a single integrated circuit.

Control circuitry 11 controls the various operations of disk drive mass storage system 30 and to exchange digital data with SSD channel 10, the pre-amp 14 and host 32. Control circuitry 11 includes a microprocessor 28, a disk control 24, a random access memory (RAM) 26, and a read only memory (ROM) 29. Microprocessor 28, disk control 24, RAM 26, and ROM 29 together provide control and logic functions to disk drive mass storage system 30 so that data may be received from host 32, stored, and later retrieved and provided back to host 32. ROM 29 includes preloaded microprocessor instructions for use by microprocessor 28 in operating and controlling disk drive mass storage system 30. ROM 29 may also include the operational parameters, discussed above, that are supplied to parameter memory 22 during start-up. RAM 26 is used for storing digital data received from host 32 before being supplied to SSD channel 10 and received from SSD channel 10 before being supplied to host 32. RAM 26 may also provide data to microprocessor 28 and store data or results calculated by microprocessor 28. Disk control 24 includes various logic and bus arbitration circuitry used in properly interfacing disk drive mass storage system 30 to host 32 and for internally interfacing control circuitry 11 to SSD channel 10 and to the pre-amp status register in pre-amp 14. Depending on the circuit implementation, any of a variety of circuitry may be used in disk control 24.

Figure 2:
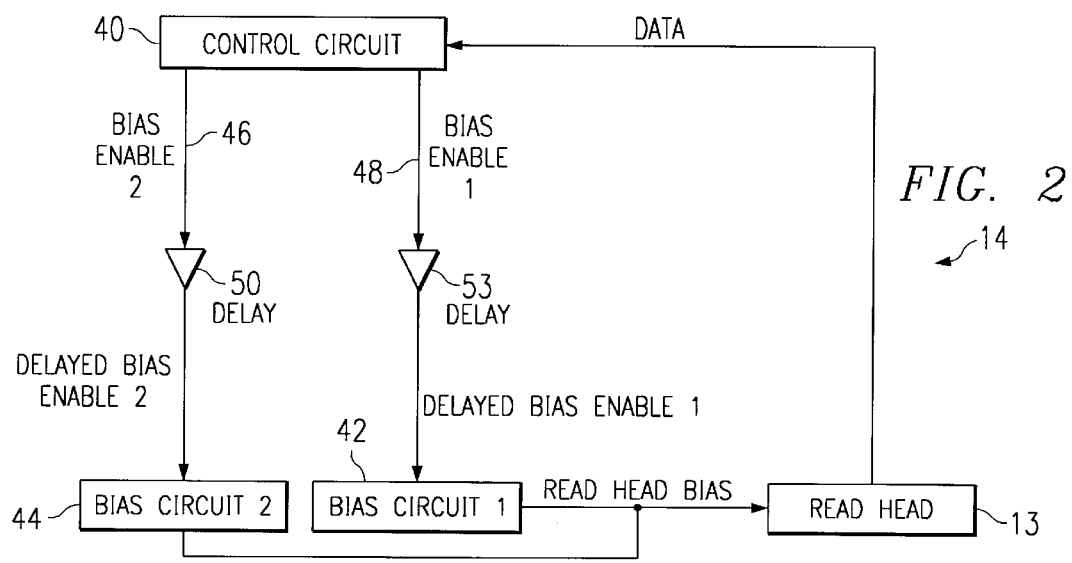
FIG. 2 is a block diagram of a preferred embodiment of the present invention.

FIG. 2 is a block diagram of an embodiment of the present invention. FIG. 2 includes pre-amp circuitry 14 to drive a read head 13 of the disk drive. Pre-amp circuitry 14 includes a control circuit 40 which controls the logic of the pre-amp. The pre-amp has two or more bias circuits 42, 44 for providing a bias for the read head 13. The control circuit 40 provides a bias enable signal 46, 48 to each bias circuit 42, 44 through a delay circuit 50, 52. The delay circuits are preferably configured to provide an unsymmetrical delay to the bias enable signal.

Figure 3:
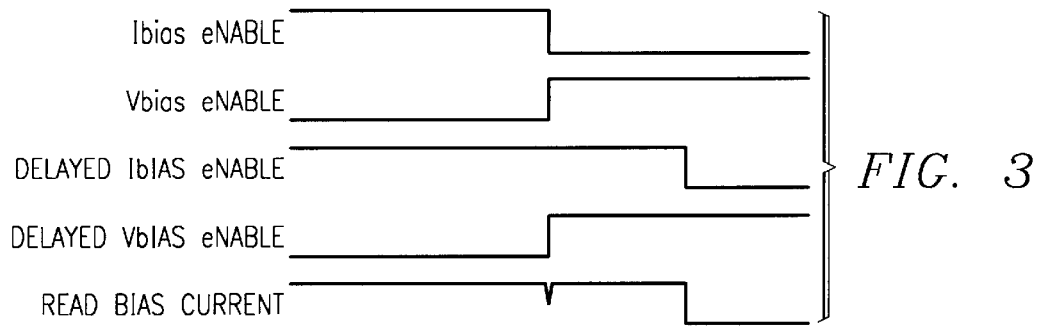
FIG. 3 is timing diagram of a preferred embodiment of the present invention.

FIG. 3 show a timing diagram for the delayed bias enable circuits. Bias enable 1 and Bias enable 2 signals from the control circuit 40 are inputs to the delay circuits 50 and 52. The delayed signals from the delay circuits are shown as signals Delayed Bias enable 1 and Delayed Bias enable 2. The delay circuits provide a delay on the high-to-low transition, and essentially no delay on the low-to-high transition as shown. This unsymmetrical delay ensures that the read head bias current will continue to be driven during the biasing transition to reduce voltage swings that could damage the head, as shown by the Read Bias Current with only a small glitch at the bias transition in FIG. 3.

Figure 4:
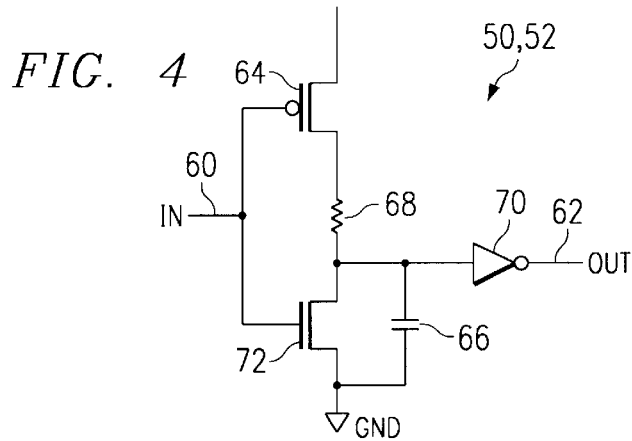
FIG. 4 is a schematic diagram of a timing delay circuit for a preferred embodiment of the present invention.

FIG. 4 shows an exemplary delay circuit 50, 52. The delay circuit provides a delay from input 60 to output 62 on the high to low transition of input 60. Input 60 is connected to transistor 64, which charges capacitor 66 through resistor 68 on the high to low transition. The resistor-capacitor time constant of resistor 68 and capacitor 66 will determine the delay. The inverter 70 provides a logic level change to drive the output 62 to the same logic level as the input 60. On the low to high transition of input 60, transistor 64 is turned off and transistor 72 is turned on. Transistor 72 quickly discharges capacitor 66 to provide only a nominal delay to the low to high transition. Any other traditional delay circuit could be used in the present invention which has an unsymmetrical delay.

Figure 5:
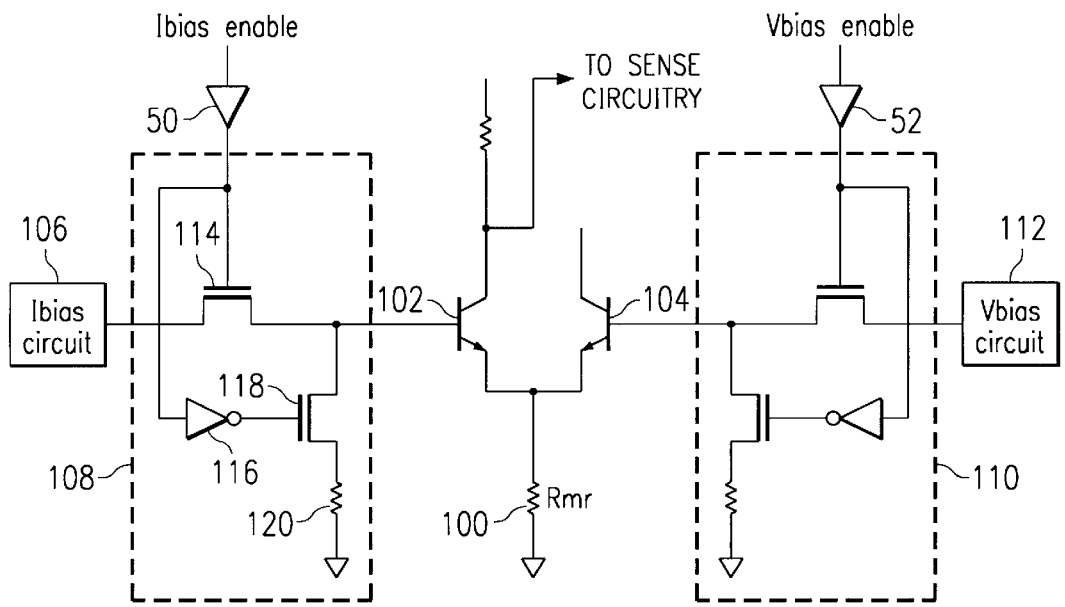
FIG. 5 is a schematic diagram of a preferred embodiment of the present invention.

FIG. 5 shows a head bias circuit according to an embodiment of the present invention. This circuit is an implementation of the circuit shown in the block diagram of FIG. 2. The circuit provides two bias currents, a current controlled bias and a voltage controlled bias, to the read head 100 through transistors 102 and 104. The head is connected to ground and to the emitters of transistors 102 and 104. The base of transistor 102 is driven by I Bias Circuit 106 through a Bias Enable circuit 108. Similarly, the base of transistor 104 is driven by V Bias Circuit 112 through a Bias Enable circuit 110.

In the illustrated embodiment of FIG. 5, the Bias Enable circuits 108, and 110 drive the base of the bias transistors 102 and 104 respectfully when an input to a bias enable circuit is active. The Bias Enable circuit 108 has a first transistor 114 with the source connected to the I bias Circuit, the drain connected to the base of transistor 102, and the gate connected to the I Bias Enable input. The input to the bias enable circuit is also connected to the input to inverter 116, and the output of the inverter 116 connected to the gate of transistor 118. The transistor 118 has a source connected to the base of transistor 102 and a drain connected to ground through resistor 120. The I Bias Enable input and the V Bias Enable input to the circuit are connected to the Bias Enable Circuits 108 and 110 through a delay circuit 50, 52. The delay circuits may be as described above with reference to FIG. 4.

The operation of the circuit of FIG. 5 will now be described. When the I bias Enable input is active, transistor 114 is turned on to connect the I Bias Circuit to the base of transistor 102, which supplies I Bias current to the head 100. When the I bias Enable input is inactive, transistor 114 is turned off and transistor 118 is turned on to connect the base of transistor 102 to ground, which turns off transistor 102. Similarly, the Bias Enable circuit 110 operates in the same manner to connect the V Bias Circuit to transistor 104 when the V Bias Enable input is active to provide a second bias current to the head 100. Since the delay circuits 50 and 52 have an unsymmetrical delay, when one bias circuit enable is set active and the other is made inactive at the same time by the control circuit, the bias currents will both be turned on for a short period. Thus the bias circuit that is being turned off will remain on for an overlap period while the bias circuit being turned on can become stable as described with reference to FIG. 3. This overlap will reduce any glitches caused by the switching in the control circuit as well as any transients due to the second bias circuit turning on and becoming stable.

Although the present invention has been described in detail it should be understood that various changes and substitutions may be made hereto without departing from the scope of the present invention as defined by the appended claims. For example, in an alternative embodiment, the delay circuits 50, 52 could be incorporated into the control circuit 40 where the control circuit has sufficient speed.

What is claimed is:

1. A bias switching circuit for a read head of a hard disk drive, comprising:
   at least a first and second bias circuit to supply a read head bias;
   first and second enable circuits to enable the first and second bias circuits, and
   a control circuit to control the enable circuits;
   wherein the first bias is delayed to the first enable circuit until the second bias circuit is turned off by the second enable circuit and the delay circuit provides an unsymmetrical delay inverter.

2. The bias circuit of claim 1, further comprising a delay circuit driving the input to at least one of the enable circuits to delay the transition to the disable state of the at least one bias circuit.

3. The bias circuit of claim 1, wherein the unsymmetrical delay inverter is delayed on the high to low transition to provide a delayed turnoff of the second bias circuit.

4. The bias circuit of claim 1, wherein the control circuit turns on the first bias circuit before turning off the second enable circuit to delay the transition to the disable state of the at least one bias circuit.

5. A disk drive comprising:
   a read head,
   a bias switching circuit for the read head, comprising:
   at least a current and a voltage bias circuit to supply a read head bias;
   first and second enable circuits to enable the current and voltage bias circuits,
   a control circuit to control the enable circuits, and
   a delay circuit driving the input to at least one of the enable circuits to delay the transition to the disable state of the at least one bias circuit with an unsymmetrical delay inverter,
   wherein the current bias circuit is controlled by the first enable circuit and the second bias circuit is controlled by the second enable circuit.

6. The disk drive of claim 5, wherein the unsymmetrical delay inverter is delayed on the high to low transition to provide a delayed turnoff of the second bias circuit.

7. The disk drive of claim 5, wherein the control circuit turns on the first bias circuit before turning off the second enable circuit to delay the transition to the disable state of the at least one bias circuit.

8. A bias switching circuit for a read head of a hard disk drive, comprising:
   at least a current bias and voltage bias circuit to supply a read head bias;
   first and second enable circuits to enable the current and voltage bias circuits to turn on a first and second bias transistors which drive an MR head,
   a control circuit to control the enable circuits, and
   a delay circuit between the control circuit and at least one of the first and second enable circuits to delay the transition to the disable state of the at least one bias circuit with an unsymmetrical delay inverter:
   wherein the first bias turnoff is delayed by the first enable circuit until the second bias circuit is turned on by the second enable circuit.

9. The bias circuit of claim 8, wherein the unsymmetrical delay inverter is delayed on the high to low transition to provide a delayed turnoff of the second bias circuit.

10. The bias circuit of claim 8, wherein the control circuit turns on the first bias circuit before turning off the second enable circuit to delay the transition to the disable state of the at least one bias circuit.

* * * * *